United States Patent

Lynes et al.

[15] 3,699,542

[45] Oct. 17, 1972

[54] TWO-TERMINAL TRANSISTOR MEMORY UTILIZING SATURATION OPERATION

[72] Inventors: Dennis Joseph Lynes, Madison; Jerry Mar, Scotch Plains, both of N.J.

[73] Assignee: Bell Telephone Laboratories, Incorporated, Murray Hill, N.J.

[22] Filed: Dec. 31, 1970

[21] Appl. No.: 103,166

[52] U.S. Cl................340/173 R, 307/238, 307/280, 307/283

[51] Int. Cl. ............................................G11c 11/40

[58] Field of Search...340/173 R; 307/238, 280, 283, 307/300, 302

[56] References Cited

UNITED STATES PATENTS

| | | | |
|---|---|---|---|
| 3,487,376 | 12/1969 | Hart, Jr. | 340/173 R |
| 3,535,526 | 10/1970 | Henry et al. | 250/209 |

OTHER PUBLICATIONS

E. E. Davidson, " Dual Emitter Avalanche Transistor Memory Array" IBM Tech. Disclosure Bulletin Vol. 11 No. 11 Apr. 1969 pp. 1436- 1437.

*Primary Examiner*—Malcolm A. Morrison
*Assistant Examiner*—David H. Malzahn
*Attorney*—R. J. Guenther and Arthur J. Torsiglieri

[57] ABSTRACT

A semiconductor memory cell containing a dual emitter transistor having an uncontacted base is operated as a two-terminal device. A voltage pulse circuit connected to the first emitter, a conduction detector voltage pulse circuit is connected to the second emitter, and a resistor is connected between the first emitter and the collector. Bit information is written into the cell by setting the potential of the base of two values, which represent respectively a "1" and "0." A "1" is written into the cell by applying appropriate polarity and amplitude voltage pulses to the two emitters to bias the first emitter-base junction to avalanche breakdown and to forward bias the second emitter-base and collector-base junctions so as to cause the transistor to operate in saturation. To read out information previously stored in the cell and write a "0" into the cell, a positive going voltage pulse is applied by the voltage pulse circuit to the first emitter.

12 Claims, 3 Drawing Figures

INVENTORS D. J. LYNES
J. MAR
BY
[signature]
ATTORNEY

TWO-TERMINAL TRANSISTOR MEMORY UTILIZING SATURATION OPERATION

BACKGROUND OF THE INVENTION

1. Field of the Invention

This invention relates to semiconductor memory apparatus which utilizes a single two-terminal transistor as a component of large information capacity semiconductor memories.

2. Description of the Prior Art

In computers and related applications there exists a need for large information capacity semiconductor memories in which information can be temporarily stored and read out within a useful period of time. To meet such requirements, it is necessary that the basic memory cell be of a sufficiently simple structure to permit a relatively large number to be fabricated and interconnected on a single monolithic integrated circuit chip.

To this end, prior art memory cells have used charge storage diodes for retaining information bits. One serious disadvantage of such memory cells is that the maximum storage time is limited to the minority carrier lifetime of the diodes used. Another disadvantage is that, as the physical size of the diodes and the amount of write current decreases, the magnitude of the stored charge which serves as the output signal decreases, thereby necessitating sensitive amplifiers to detect the small current differences between a stored "1" and "0."

In copending application of S. G. Waaben, Ser. No. 864,705, filed Oct. 8, 1969, now U.S. Pat. No. 3,626,389, in which there is a common assignee to this invention, the storage time has been extended through the use of two serially connected diodes which have different minority carrier lifetimes.

In copending application of M. Feldman and G. L. Heiter, Ser. No. 46,646, filed June 16, 1970 a light activated memory cell is described which utilizes a single transistor having an uncontacted photosensitive base. Signal light received over a period of time on the photosensitive base causes a build up of charge on the base which flows into the emitter-base junction when the transistor is turned on and gives rise to a collector current that is beta times the light signal created base current. This amplification of the output signal is very desirable; however, in many applications it is not practical to use any other input signal than an electrical one that is physically connected to the cell.

One solution to this problem is the use of a transistor having a contacted base, collector, and emitter. This solution works well for a single cell but is impractical to implement in a large memory because the making of three electrical contacts to each memory cell unduly increases the size of the integrated circuit chip and the complexity of the fabrication process.

The foregoing makes it clear that it is desirable to provide a practical two-terminal memory cell having transistor amplication of the signal, a storage time longer than the minority carrier lifetime and an electrical input wired to the cell, but to date no such device has been built.

OBJECTS OF THE INVENTION it is an object of this invention to provide a semiconductor memory cell with increased storage time.

It is another object of this invention to provide a memory cell capable of use over wide voltage margins.

It is still another object of this invention to provide a memory cell having a high degree of detection sensitivity between a "1" and a "0."

It is a further object of this invention to provide a two-terminal memory cell which meets the above-mentioned objectives, is easily fabricated using standard integrated circuit techniques, and consists of only a single transistor.

It is a still further object of this invention to provide a relatively large capacity semiconductor memory using interconnected memory cells each meeting the above-mentioned objectives.

SUMMARY OF THE INVENTION

These and other objects of the invention are attained in an illustrative embodiment thereof comprising a memory cell consisting of a single dual emitter transistor having a resistor connected between the first emitter and the collector and an uncontacted base whose floating potential is set to one of two values, which represent respectively a stored "1" and "0." A voltage pulse circuit is connected to the first emitter and a conduction detector is connected to the second emitter.

A "1" is written into the cell by applying appropriate polarity and amplitude voltage pulses to the two emitters to reverse bias the first emitter-base junction to avalanche breakdown and to forward bias the second emitter-base and the collector-base junctions so as to cause the transistor to operate in saturation. The useful storage time of information written into the cell is determined by the leakage of charge from the base into the relatively high impedance reversed biased semiconductor junctions. To read out information previously stored within the cell and write a "0" into the cell, a positive polarity voltage pulse is applied to the first emitter.

The simplicity of the structure of this memory cell, the two-terminal operation, the relatively long retention period of stored information, and the ease of fabrication using standard integrated circuit techniques make this memory cell well suited for use in large capacity integrated circuit memories.

These and other objects, features and advantages of this invention will be better understood from a consideration of the following detailed description, taken in conjunction with the accompanying drawings.

DETAILED DESCRIPTION

Figure 1:
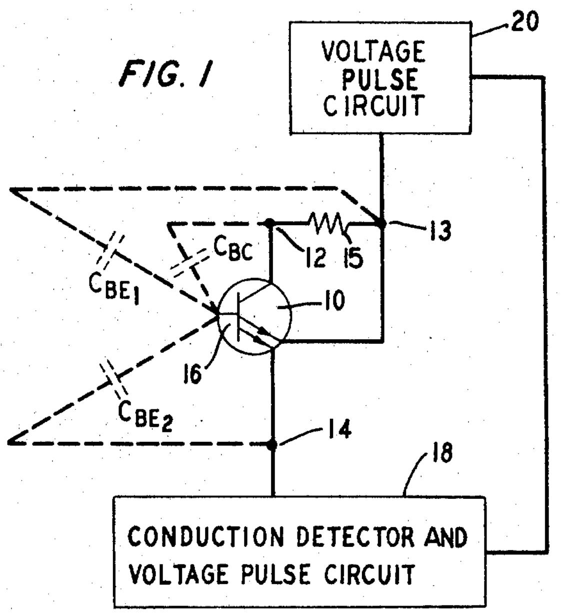
FIG. 1 illustrates a schematic diagram of a two-terminal NPN transistor memory cell in accordance with this invention.

Referring now to FIG. 1, there is shown an illustrative embodiment of the invention comprising an NPN transistor 10 containing a collector terminal 12, a first emitter terminal 13, a second emitter terminal 14, a resistor 15 coupled between terminals 12 and 13, and an uncontacted base 16. A voltage pulse circuit 20 is connected to emitter terminal 13. A circuit 18 is connected to emitter terminal 14 which acts as a conduction detector and voltage pulse circuit. The parasitic capacitances $C_{BC}$, $C_{BE}$ , and $C_{BE}$ associated with the collector-base junction, the first emitter-base junction, and the second emitter-base junction, respectively, are shown external to the transistor in order to simplify the description of the mode of operation which appears below. These capacitances serve as low impedance ac paths between the collector, base, and emitters.

The potential of the base 16 floats and is set to one of two values, which represent respectively the storage of a "1" and "0" in the cell by applying appropriate polarity and amplitude voltage pulses to the emitter terminals 13 and 14.

A "1" is stored in a cell containing a "0" by applying appropriate polarity and amplitude write voltage pulses to the two emitter terminals sufficient to bias the first emitter-base junction to avalanche breakdown and to raise the base potential sufficiently to forward-bias the collector-base and second emitter-base junctions. The broken down emitter-base junction is a low impedance path between the voltage pulse circuit 20 and the uncontacted base 16. Current flows to the base and gives rise to transistor conduction. Due to forward-bias condition of the collector-base junction the transistor operates in saturation.

Termination of the write pulses causes the first emitter-base junction to cease operating in avalanche breakdown thereby cutting off transistor conduction. The base potential starts to decrease toward the "0" potential but is inhibited from completely doing so by the flow of holes into the base which cause the base to assume a more positive potential than the "0" potential. This resulting potential is defined as the "1" potential. The saturation operation is responsible for the holes which exist in the transistor after conduction is terminated. The saturation operation, which causes the holes, will be discussed later.

In order to detect information stored in the cell, a positive polarity read voltage pulse is applied to emitter terminal 13. Emitter terminal 14 is held at a positive potential which does now allow the read pulse to bias the first emitter-base junction to avalanche breakdown. If a "1" is stored in the cell the base potential rises and attains a value such that the second emitter-base junction is forward biased and transient transistor conduction occurs. If a "0" is stored in the cell, the base potential rises but fails to attain a value sufficient to allow transistor conduction. At the termination of the read pulse the base assumes the "0" potential.

In operation, to write a "1" on a base containing a "0,"a positive based write voltage pulse having a positive polarity is applied to emitter terminal 13 by the voltage pulse circuit, and a positive based voltage write pulse having a negative polarity is applied to emitter terminal 14 by the conduction detector and voltage pulse circuit. The leading edges of the two write pulses cause the first emitter-base junction to be biased to avalanche breakdown and the base potential to rise so as to forward-bias the second emitter-base junction. The broken down emitter-base junction acts as a low impedance path between the first emitter terminal and the uncontacted base. The base can now receive current from the voltage pulse circuit via the broken down emitter-base junction. Transistor conduction occurs since there is a supply of base current and the second emitter-base junction is forward-biased. The transistor operates in a saturation mode of operation since the resistor coupled between the first emitter and collector is of sufficient ohmic value to drop the collector potential below the base potential, thereby forward-biasing the collector-base junction.

As is well known, when the supply of base current to a transistor operating in saturation is suddenly cut off, holes flow into the base temporarily raising the base potential thereby permitting conduction to continue for a period of time. This time period is determined by the time it takes the holes within the transistor to recombine with electrons and thereby effectively exit the transistor. Some of the holes exit the transistor due to leakage. The effective lifetime of the holes existing in the transistor after conduction ceases is a function of the recombination and leakage rates.

The trailing edges of the write pulses terminate transistor conduction by lowering the bias across the first emitter-base junction causing it to cease to operate in avalanche breakdown, thereby cutting off the supply of base current to the transistor and terminating transistor conduction. The net effect of the trailing edges of the write pulse on the base is to decrease its potential below the "0" potential; however, the holes within the transistor flow into the base and override any decrease in base potential. They in fact cause the base to increase in potential to a potential more positive than the "0" potential. This potential is defined as the "1" potential.

It is necessary that the fall times of the trailing edges of the write pulses be equal to or less than the effective lifetime of the holes in order for the base potential to be raised to the "1" potential and not lowered in potential below the "0" potential. In a preferred embodiment the lifetime of the minority carriers is approximately 50 nanoseconds and the fall times are approximately 10 nanoseconds.

In order to detect the base potential and thereby determine the stored information in the cell, a positive based read voltage pulse having a positive polarity is applied to emitter terminal 13 by the voltage pulse circuit while emitter terminal 14 is held at a positive potential by the conduction detector and voltage pulse circuit. The leading edge of the read pulse causes the base potential to rise sufficiently with respect to the emitter terminal potential to forward-bias the emitter-base junction sufficiently to allow transistor conduction if, and only if, the base was previously at the "1" potential. Transient transistor conduction upon the application of a read pulse to the memory cell is interpreted as a "1," whereas nontransistor conduction is interpreted as a "0."

The pulse width of the read pulse is such that transient transistor conduction, which occurs if the cell was previously at the "1" potential, ceases prior to the start of the trailing edge of the read pulse. Upon termination of transient transistor conduction the second emitter-base junction is left forward-biased, but not sufficiently to permit conduction. The trailing edge of the read pulse then lowers the base potential down to the "0" potential. Therefore, the reading out of a stored "1" from the cell is equivalent to the writing of a "0" into the cell.

If a read pulse is applied to a memory cell containing a stored "0," the leading edge of the pulse raises the base potential with respect to the second emitter potential sufficiently to forward-bias the second emitter-base junction, but not sufficiently to allow transistor conduction. The trailing edge of the read pulse then lowers the base potential back to the "0" potential. It is, therefore, apparent that the reading out of a stored "1" or "0" from the cell causes the writing of a "0" into the cell.

If a read pulse is applied to a memory cell that contains a stored "0," some current flow, due to the voltage change across the series combination of $C_{BE_1}$ and is detected by the conduction detector voltage control source. Practically no current flows in $C_{BC}$ due to the relatively large ohmic value of the resistor which shunts the first emitter and the collector. There is no transistor conduction because the base potential does not become positive enough to cause the second emitter-base junction to be sufficiently forward-biased to permit conduction. If $C_{BE_1}=C_{BE_2}$, then the induced current is directly proportional to $C_{BE_1}/2$. This current is the output signal representing a stored "0."

If a read pulse is applied to a memory cell that contains a stored "1," an initial current identical to that corresponding to a stored "0" will be detected. In response to the read pulse, the base potential rapidly increases so as to forward-bias the second emitter-base junction. The forward-biased emitter-base junction is a low impedance shunt across $C_{BE_2}$ that limits any further change in potential across $C_{BE_2}$. The current now induced in $C_{BE_1}$ is directly proportional to $C_{BE_1}$ and not to $C_{BE_1}/2$, as is the case for a stored "0." This induced current in $C_{BE_1}$ flows into the forward-biased second emitter-base junction, is amplified by a factor of $\beta 62+1$ and is detected by the conduction detector and voltage pulse circuit that is connected to emitter terminal 14. This current is the output signal which represents a stored "1."

The current detected for a stored "1" is, therefore, proportional to $C_{BE_1}(\beta+1)$, as compared to a "0" current proportional only to $C_{BE_1}/2$. This means that the ratio of the output signal for a "1" to a stored "0" is approximately $2(\beta+1)$:1. A $\beta$ of even 9 results in a 20:1 difference between a "1" and "0."

In a preferred embodiment of the invention an NPN transistor having two electrically separate emitters and an uncontacted base is utilized as a two-terminal memory cell. A resistor of 5,000 ohms is connected between the first emitter and the collector. The reverse breakdown potential of the emitter-base junction is approximately 6.5 volts. The amplitude of the positive polarity write voltage pulse applied to emitter terminal 13 is 5 volts; the amplitude of the negative polarity write voltage pulse applied to terminal 14 is 3 volts. The base level of both pulses is +3 volts. The read voltage pulse is identical to the positive polarity write voltage pulse. The "1" base potential is approximately +3.4 volts and the "0" base potential is approximately +.9 volt.

Relatively large variations in read or write pulse amplitudes can be tolerated with little effect on circuit performance. For example, write pulses with amplitudes greater than 5 volts and 3 volts, respectively, can be used with little effect on the valve of the "1" base potential.

For example, an increased amplitude of the write pulse applied to emitter terminal 13 causes an increase in collector current that causes a greater number of holes in be temporarily trapped in the transistor after saturation conduction terminates. These additional holes negate the increased amplitude of the trailing edge of the writing pulses and thereby maintain the "1" base potential at +0.9 volt.

As has been illustrated, the read operation causes a "0" to be stored in the cell. At the termination of the read operation the potential of two emitters and collector is +3 volts and the potential of the base is +0.9 volt, the "0" potential. The emitter-base junctions and the collector-base junction are therefore reverse-biased and represent high impedance paths to charge stored on the base. If these reverse-biases junctions were of infinitely high impedance, the charge stored in the base, which causes the base potential to be at +0.9 volt, would remain in the base forever, and therefore the information stored in the cell could be read out at any later time. The impedances associated with the reverse-biased junctions, however, do not have infinitely high impedance and therefore charge stored on the base will leak into these reverse-biased junctions and the base potential will reach the same potential as the emitters and collector, +3 volts. If a stored "0" is not detected before the charge leaks from the base, a "1" will be detected instead of a "0", since a base potential of +3 volts is sufficiently close to +3.4 volts, the "1" potential, to be mistaken for a "1." Stored " 1'st" are never destroyed unless intentionally removed from the cell.

By using standard integrated circuit techniques, it is possible to construct a single memory cell, including wiring, in just ten millionths of a square inch. One hundred memory cells can be fabricated and interconnected on a single integrated circuit chip having an area of approximately 0.1 square inch.

An advantage of this memory cell is that the saturation operation produces a relatively large number of holes within the transistor after the supply of base current is cut off. These holes are able to cause a relatively large increase in the base potential which allows relatively wide tolerances on the amplitudes of the write pulses.

Figure 2:
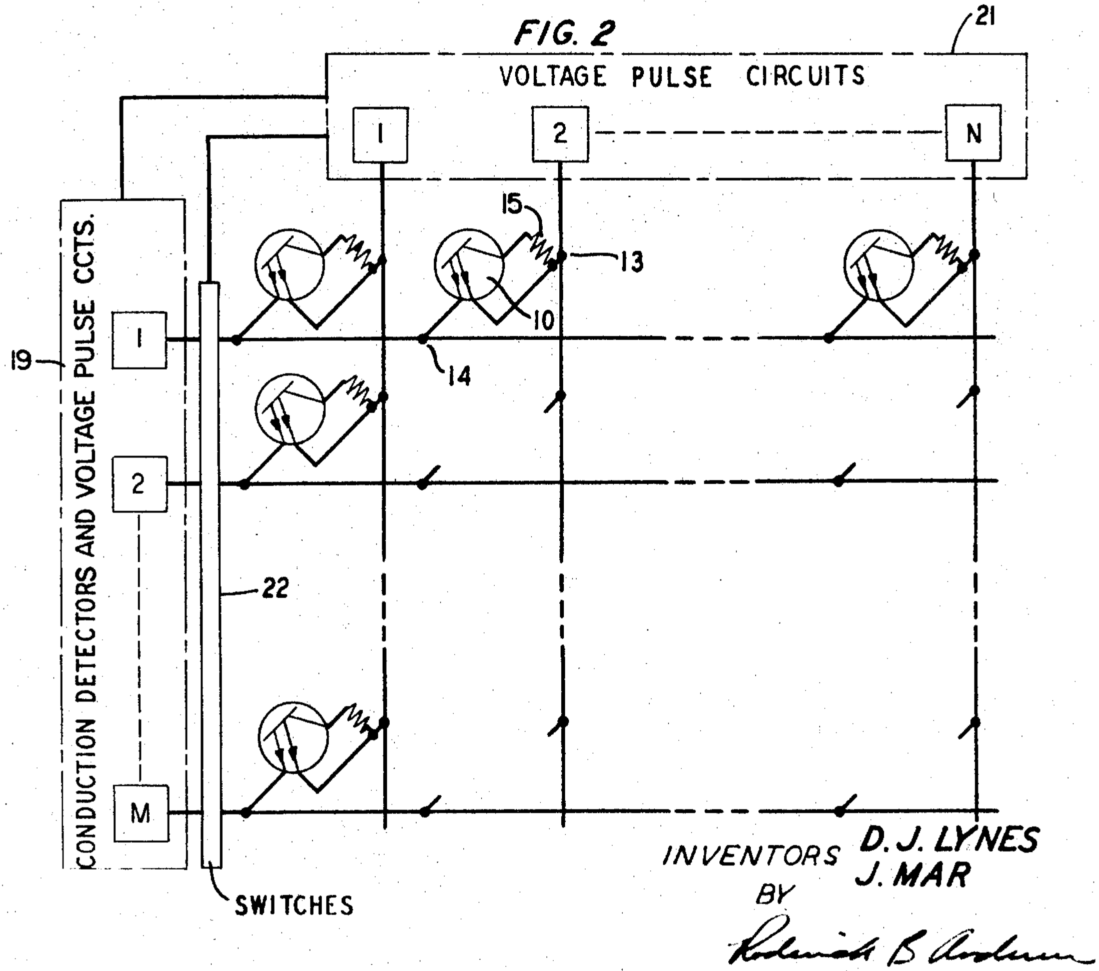
FIG. 2 illustrates a memory system formed using the NPN transistor memory cell of FIG. 1.

Referring now to FIG. 2 there is shown another illustrative embodiment of the invention comprising an array of transistors 10 forming a bit organized memory. The array is arranged in M rows and N columns of individual NPN transistors which are interconnected to form a memory having MxN memory cells. All of the emitter terminals 13 in a common column are interconnected; all of the emitter terminals 14 in a common row are interconnected. Voltage pulse circuits 21 are electrically connected to the common emitter terminals 13. Circuits 19, which act as conduction detectors and voltage pulse circuits are electrically connected to the common emitter terminals 14 through switches 22. A resistor 15 is coupled between the collector and emitter terminal 13 of each transistor 10. In operation this multicell memory is similar to that of the single memory cell of FIG. 1.

In operation, to write a "1" into a preselected cell, a positive based write pulse having a positive polarity is applied to the column to which emitter terminal 13 of the preselected cell is electrically connected and a positive based write pulse having a negative polarity is electrically connected to the row containing emitter terminal 14 of the preselected cell. All other columns are held at a positive potential. The switch corresponding to the row connected to the preselected cell is closed; all other switches are left open.

To read out information stored in a preselected cell and write a "0" into the cell, the same procedure for writing a "1" into the cell is used except that emitter terminal 14 is held at a positive potential instead of being pulsed negatively.

The above-mentioned write and read operations allow information to be written into or read out of a preselected cell without destroying information stored in all other cells of the memory array. This feature allows the memory to be used as a bit organized memory.

One undesirable feature associated with this embodiment is that the writing of a "1" into a preselected cell will cause all other cells in the common row to conduct for a period of time. The base potential of each of these cells will be first lowered, permitting conduction, and then raised, cutting off conduction. This causes some change in the value of "1" and "0" potentials, but still leaves the "1" potential as the more positive of the two. As a practical matter these variations in the "1" and "0" base potential can be tolerated without any serious detrimental effect to circuit performance.

Figure 3:
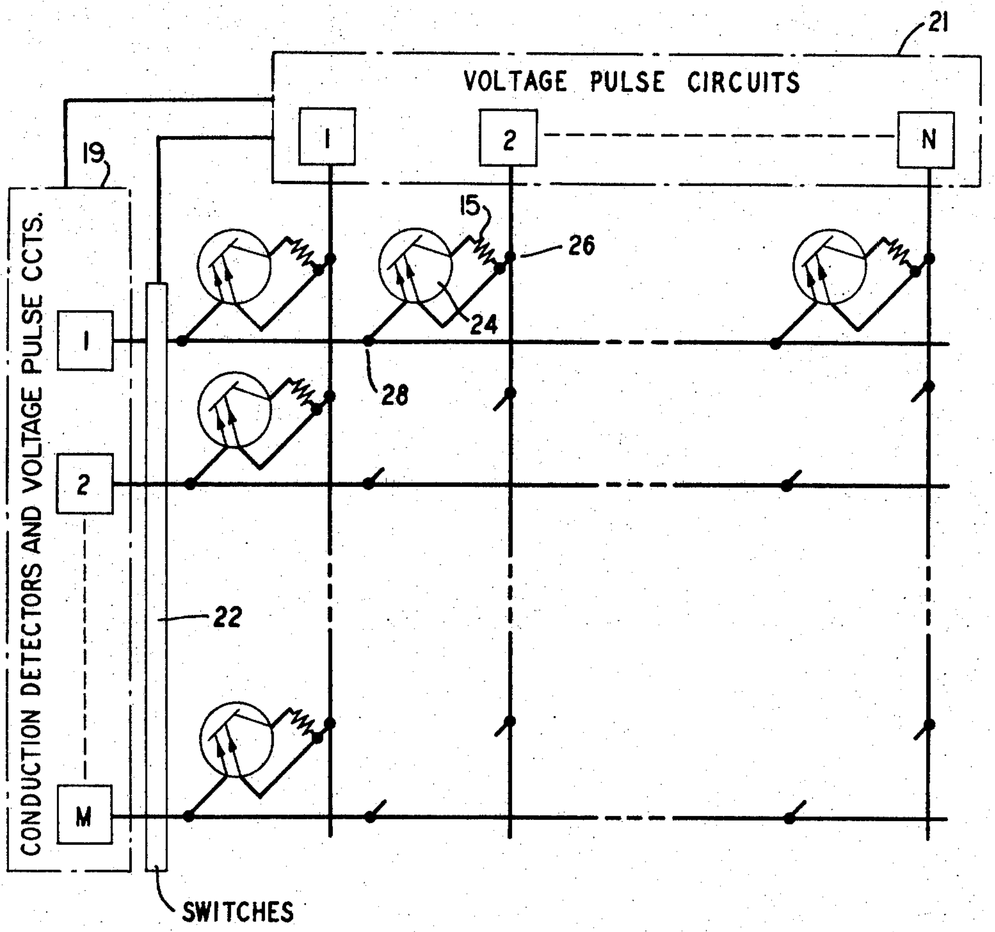
FIG. 3 illustrates another memory system formed using PNP transistor memory cells.

Referring now to FIG. 3 there is shown another illustrative embodiment of the invention comprising an array of PNP transistors 24 forming a bit organized memory. The array is organized in M rows and N columns of individual PNP transistors which are interconnected to form a memory having MxN cells. All of the emitter terminals 26 in a common column are interconnected; all of the emitter terminals 28 in a common row are interconnected. Voltage pulse circuits 21 are electrically connected to the common emitter terminals 26. Circuits 19, which act as conduction detectors and voltage pulse circuits, are electrically conducted to the common emitter terminals 28 through switches 22. A resistor 15 is coupled between the collector and emitter terminal 26 of each transistor 24.

The operation of this memory is the same as that of the memory of FIG. 2 except that the polarities of the read and write voltage pulses must be reversed. The "0" base potential is more positive than the "1" base potential. Electrons, which are temporarily trapped within the transistor following the termination of saturation conduction, flow into the base and cause the base to assume the "1" potential.

The embodiments described are intended to be illustrative of the principles of the invention. Various other modifications and embodiments may be made by those skilled in the art without departing from the spirit and scope of the invention. For example, the bit organized memory can be easily converted into a word organized memory.

We claim:

1. A semiconductor memory cell comprising:

a junction transistor having two electrically isolated emitters and an uncontacted base, the potential of which floats at two values which represent, respectively, a "1" and a "0" stored in the cell;

first circuit means coupled to the transistor for biasing the first emitter-base junction to avalanche breakdown and forward-biasing the second emitter-base junction and the collector-base junction to set the potential of the base to a first value which is defined as a "1;" and second means coupled to the transistor for first increasing and then decreasing the potential of the first emitter to set the potential of the base to a second value which is defined as a "0."

2. A semiconductor cell comprising:

a junction transistor having two electrically isolated emitters, a resistor coupled between the first emitter and the collector, and an uncontacted base, the potential of which floats at two different values which represent, respectively, the storage of a "1" and "0" in the cell;

a first circuit means coupled to both emitters of said transistor for first adjusting the emitter potentials from initial values to values sufficient to bias the first emitter-base junction to avalanche breakdown, to forward-bias the second emitter-base junction, and to increase the base potential sufficiently to forward-bias the collector-base junction, thereby causing the transistor to conduct in saturation, and then returning the emitter potentials to the initial values, whereby transistor conduction is terminated leaving minority carriers trapped within the transistor for a period of time, whereupon the base potential starts to return to the "0" potential but instead returns to a different potential defined as the "1" potential; and a second circuit means coupled to said transistor for first increasing the first emitter potential from an initial value to a value sufficient to cause transient transistor conduction only if a "1" is stored in the cell, and then decreasing the emitter potential to its initial value, whereby the base potential assumes the "0" potential.

3. The memory cell of claim 2 wherein said first and second means constitute part of a voltage pulse circuit adapted to supply voltages of different amplitudes and polarities.

4. The memory cell of claim 2 wherein the time required to decrease the first emitter potential and increase the second emitter potential is less than or equal to the period of time in which holes exist in said transistor after saturation conduction is terminated.

5. Semiconductor memory apparatus comprising:

a plurality of memory cells, each of which comprises an NPN junction transistor having two electrically isolated emitters, a resistor coupled between the first emitter and the collector, and an uncontacted base, the potential of which floats at two different values which represent, respectively, the storage of a "1" and "0" in the cell;

a first circuit means coupled to a preselected transistor memory cell for first adjusting the emitter potentials from initial values to values sufficient to bias the first emitter-base junction to avalanche breakdown, to forward-bias the second emitter-base junction, and to increase the base potential sufficiently to forward-bias the collector-base junction, thereby causing the transistor to conduct in saturation, and then returning the emitter potentials to the initial values, whereby transistor conduction is terminated leaving holes trapped within the transistor for a period of time, whereupon the base potential starts to return to the "0" potential but instead returns to a different potential defined as the "1" potential;

a second circuit means coupled to a preselected transistor memory cell for first increasing the first emitter potential from an initial value to a value sufficient to cause transient transistor conduction only if a "1" is stored in the cell, and then decreasing the emitter potential to its initial value, whereby the base potential assumes the "0" potential; and a third means forming a plurality of conduction paths coupling said memory cells to said first and second means.

6. The apparatus of claim 5 wherein said first and second circuit means constitute part of a voltage pulse circuit adapted to supply voltage pulses of different amplitudes and polarities.

7. The semiconductor memory apparatus of claim 5 further comprising conduction detector circuits and wherein the plurality of conduction paths which couple said memory cells to the first and second means also couple the memory cells to the conduction detector circuits.

8. The apparatus of claim 7 wherein the conduction detector circuits are coupled to a reference ground potential.

9. The apparatus of claim 8 wherein said conduction detector circuits are low impedances coupling said second emitters to said reference ground potential.

10. The memory apparatus of claim 5 further comprising electrically activated switches which are coupled to said second emitters, whereby a "1" or "0" can be stored in any preselected memory cell without destroying the information stored in any of the other memory cells of said semiconductor memory apparatus.

11. Semiconductor memory apparatus comprising:

a plurality of memory cells, each of which comprises an PNP junction transistor having two electrically isolated emitters, a resistor coupled between the first emitter and the collector, and an uncontacted base, the potential of which floats at two different values which represent, respectively, the storage of a "1" and "0" in the cell;

a first circuit means coupled to a preselected transistor memory cell for first adjusting the emitter potentials of said transistor from initial values to values sufficient to bias the first emitter-base junction to avalanche breakdown, to forward-bias the second emitter-base junction, and to decrease the base potential sufficiently to forward-bias the collector-base junction, thereby causing the transistor to conduct in saturation, and then returning the emitter potentials to the initial values, whereby transistor conduction is terminated leaving electrons trapped within the transistor for a period of time, whereupon the base potential starts to return to the "0" potential but instead returns to a different potential defined as the "1" potential;

a second circuit means coupled to a preselected transistor memory cell for first decreasing the first emitter potential from an initial value to a value sufficient to cause transient transistor conduction only if a "1" is stored in the cell, and then increasing the emitter potential to its initial value, whereby the base potential assumes the "0" potential; and a third means forming a plurality of conduction paths coupling said memory cells to said first and second means.

12. A method for performing a memory function utilizing at least one memory cell having two electrically isolated emitters, a resistor coupled to one of the emitters and the collector, and an uncontacted base, the potential of which floats at two values which represent, respectively, a "1" and a "0" stored in the cell comprising the steps of:

writing a "1" into the memory cell by forward-biasing the collector-base junction and the second emitter-base junction and biasing the first emitter-base junction to avalanche breakdown such that the potential of the base is set to a level defined as a "1;" and reading out information stored in the cell by increasing the potential of the first emitter sufficiently to cause conduction in the transistor if a "1" is stored in the cell and then decreasing the potential of the first emitter such that the potential of the base is set to a level defined as a "0."

* * * * *

UNITED STATES PATENT OFFICE
CERTIFICATE OF CORRECTION

Patent No. 3,699,542 Dated October 17, 1972

Inventor(s) Dennis J. Lynes-Jerry Mar

It is certified that error appears in the above-identified patent and that said Letters Patent are hereby corrected as shown below:

In Abstract, line 8, after "base" insert --one of--.

Column 3, line 6, after "capacitances $C_{BC}$", "$C_{BE}$, and $C_{BE}$" should be --$C_{BE_1}$ and $C_{BE_2}$--;

line 46, after "does" delete "now" and insert --not--.

Column 5, line 17, insert --$C_{BE_2}$-- in the blank space;

line 41, "$\beta 62+1$" should be --$\beta+1$--.

Column 6, line 8, after "holes" delete "in" and insert --to--.

Signed and sealed this 6th day of March 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69